(12) United States Patent
Schwefer et al.

(10) Patent No.: US 7,485,276 B2
(45) Date of Patent: Feb. 3, 2009

(54) METHOD FOR THE REMOVAL OF $NO_x$ AND $N_2O$ FROM THE TAIL GAS IN NITRIC ACID PRODUCTION

(75) Inventors: Meinhard Schwefer, Meschede (DE); Rainer Maurer, Schwelm (DE); Thomas Turek, Düsseldorf (DE); Markus Kögel, Römerberg (DE)

(73) Assignee: Uhde GmbH (DE)

( * ) Notice: Subject to any disclaimer, the term of this patent is extended or adjusted under 35 U.S.C. 154(b) by 0 days.

(21) Appl. No.: 10/169,970

(22) PCT Filed: Jan. 9, 2001

(86) PCT No.: PCT/EP01/00157

§ 371 (c)(1), (2), (4) Date: Jan. 8, 2003

(87) PCT Pub. No.: WO01/51182

PCT Pub. Date: Jul. 19, 2001

(65) Prior Publication Data

US 2003/0143142 A1 Jul. 31, 2003

(30) Foreign Application Priority Data

Jan. 14, 2000 (DE) ................. 100 01 541

(51) Int. Cl.
*B01D 53/56* (2006.01)
(52) U.S. Cl. .................. 423/235; 423/239.1; 423/239.2
(58) Field of Classification Search ................. 423/235, 423/239.1, 239.2
See application file for complete search history.

(56) References Cited

U.S. PATENT DOCUMENTS

| | | | | |
|---|---|---|---|---|
| 3,689,212 A | * | 9/1972 | Roland et al. | ............ 423/239.2 |
| 4,571,329 A | | 2/1986 | Kato et al. | ................... 423/239 |
| 5,200,162 A | * | 4/1993 | Riley et al. | ............... 423/239.1 |
| 5,582,810 A | * | 12/1996 | Tretjak | ..................... 423/239.2 |
| 6,056,928 A | | 5/2000 | Fetzer et al. | ................. 423/235 |
| 6,682,710 B1 | * | 1/2004 | Hamon et al. | ............ 423/239.1 |
| 2002/0127163 A1 | * | 9/2002 | Chen et al. | ............... 423/239.2 |

FOREIGN PATENT DOCUMENTS

| | | | |
|---|---|---|---|
| EP | 0564144 | | 10/1993 |
| JP | 6-165919 | * | 6/1994 |
| SU | 1725991 | * | 4/1992 |
| WO | 97/10042 | | 3/1997 |
| WO | 99/34901 | | 7/1999 |
| WO | WO 99/34901 | * | 7/1999 |
| WO | WO 00/48715 | * | 8/2000 |

OTHER PUBLICATIONS

Kapteijn, F., et al, "Heterogeneous catalytic decomposition of nitrous oxide," *Applied Catalysis B: Environmental 9*:25-64, XP-000987028 (1996).
Kapteijn, F., et al, "Kinetic Analysis of the Decomposition of Nitrous Oxide over ZSM-5 Catalysts," *Journal of Catalysis 167*:256-265, XP-000979359 (1997).

* cited by examiner

*Primary Examiner*—Elizabeth D Wood
(74) *Attorney, Agent, or Firm*—Connolly Bove Lodge & Hutz LLP

(57) ABSTRACT

A process is described for reducing the $NO_x$ concentration and $N_2O$ concentration from the residual gas from nitric acid production. The process encompasses the passing of the residual gas leaving the absorption column, prior to entry into the residual gas turbine, through a combination of two stages. The first stage here reduces the $NO_x$ content and the second stage the $N_2O$ content of the gas, the $NO_x/N_2O$ ratio prior to entry of the gas into the second stage being in the range from 0.001 to 0.5, and this gas being brought into contact in the second stage with a catalyst which is substantially composed of one or more iron-loaded zeolites.

22 Claims, 1 Drawing Sheet

Figure 1:
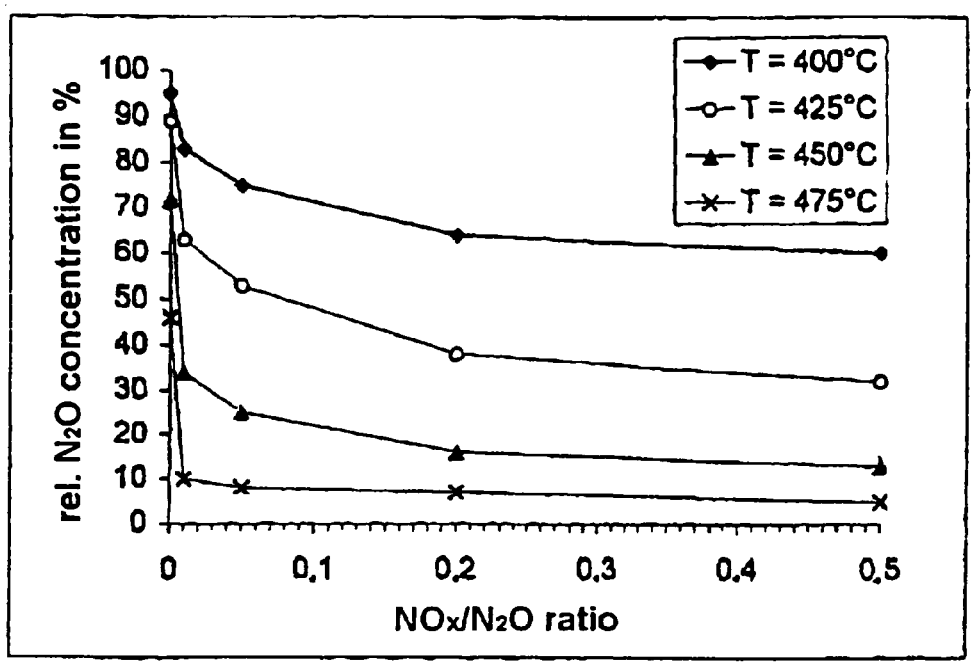

METHOD FOR THE REMOVAL OF NO$_x$ AND N$_2$O FROM THE TAIL GAS IN NITRIC ACID PRODUCTION

The present invention relates to a process for eliminating NOx and N$_2$O from the tail gas from nitric acid production.

Industrial production of nitric acid HNO$_3$ by catalytic combustion of ammonia produces a waste gas loaded with nitrogen monoxide NO, nitrogen dioxide NO$_2$ (together termed NOx), and also nitrous oxide N$_2$O. While NO and NO$_2$ have long been recognized as compounds having relevance to environment toxicity issues (acid rain, smog formation), worldwide limits having been set for maximum permissible emissions of these materials, the focus of environmental protection has in recent years increasingly also been directed toward nitrous oxide, since it makes a not inconsiderable contribution to the decomposition of stratospheric ozone and to the green-house effect.

After the adipic acid industry has reduced emissions of nitrous oxide, nitric acid production is the largest source of industrial emissions of nitrous oxide. For reasons of environmental protection, therefore, there is an urgent requirement for technical solutions for reducing nitrous oxide emissions as well as NO$_x$ emissions during nitric acid production.

There are numerous versions of processes for eliminating NOx from the waste gas from nitric acid production (termed here the DeNOx stage), such as chemical scrubbing, adsorption process, or catalytic reduction processes. Ullman's Encyclopedia of Industrial Chemistry, Vol. A 17, VCH Weinheim (1991) (D1) gives an overview. Emphasis should be given here to selective catalytic reduction (SCR) of NOx by means of ammonia to give N$_2$ and H$_2$O. Depending on the catalyst, this reduction can proceed at temperatures of from about 150° C. to about 450° C., and permits more than 90% NO$_x$ decomposition. This is the version of NOx reduction mostly utilized during nitric acid production, but, like the other versions, does not lead to any reduction in N$_2$O content.

For this purpose the current prior art requires a separate, second catalyst stage, advantageously combined with the DeNOx stage.

An example of the process based on this approach is described in U.S. Pat. No. 5,200,162, which claims the decomposition of N$_2$O in a waste gas which also comprises NOx, downstream of a DeNOx stage. Here, at least one substream of the waste gas which leaves the N$_2$O decomposition stage is cooled and returned thereto in order to avoid overheating of this stage due to the exothermic nature of the N$_2$O decomposition process. The invention relates to waste gases whose N$_2$O content is up to 35% by volume, e.g. to waste gases from adipic acid production.

A process put forward by Shell describes the integrated elimination of NOx and N$_2$O in the residual gas from nitric acid production (Clark, D. M.; Maaskant, O. L.; Crocker, M., The Shell DeNOx System: A novel and cost effective NOx removal technology as applied in nitric acid manufacture and associated processes, presented at Nitrogen '97, in Geneva, 9-11 Feb. 1997, (D2)).

The Shell reactor system is based on what is called a lateral flow reactor principle, where even relatively low temperatures (from 120° C.) are possible for the operation of the DeNOx stage. An amorphous metal oxide catalyst is used for removing N$_2$O.

When appropriate catalysts are arranged in the residual gas leaving the absorption column with a temperature of from 20 to 30° C., the latitude for possible operating temperatures is prescribed by the operating temperature of the residual gas turbine.

Specifically, for reasons associated with the technical and economic running of the entire process, the residual gas turbine should most advantageously be operated with entry temperatures <550° C. and with maximum ΔT and Δp.

This is particularly important for eliminating N$_2$O, since according to the current prior art this requires markedly higher temperatures than those needed during catalytic reduction of NOx. The cost-effectiveness of this option is therefore linked to adequate catalyst activity.

Kapteijn F.; Rodriguez-Mirarsol, J.; Moulijn, J. A., App. Cat. B: Environmental 9 (1996) 25-64, (D3) gives an overview of the numerous catalysts which have been demonstrated to be suitable in principle for decomposing and reducing nitrous oxide.

Metal-exchanged zeolite catalysts (U.S. Pat. No. 5,171,533), inter alia, appear particularly suitable for decomposing N$_2$O.

The zeolites used here are prepared by ion exchange in an aqueous solution comprising metal salts. The metals used for the ion exchange are from the group: copper, cobalt, rhodium, iridium, ruthenium, and palladium. The copper zeolites are highly sensitive to water vapor and rapidly lose their activity under those conditions (M.; Sandoval, V. H.; Schwieger, W.; Tissler, A.; Turek, T.; Chemie Ingenieur Technik 70 (1998) 878-882, (D5)), while the other metals are listed here are relatively expensive.

Using iron-doped zeolite of Fe-ZSM5 type under appropriate conditions, as described in Table 1 in U.S. Pat. No. 5,171,533, in the absence of NOx, H$_2$O, and O$_2$ at 450° C., only 20% N$_2$O decomposition was achieved.

The activity of Fe-ZSM-5 for decomposing N$_2$O is, however, markedly increased in the presence of appropriate amounts of NO, this being attributed to a reaction forming NO$_2$ as in NO+N$_2$O N→N$_2$+NO$_2$, catalyzed by Fe-ZSM-5 (Kapteijn F.; Marban, G.; Rodriguez-Mirasol, J.; Moulijn, J. A.; Journal of Catalysis 167 (1997) 256-265, (D6); Kapteijn F.; Mul, G.; Marban, G.; Rodrigeuez-Mirasol, J.; Moulijn, J. A., Studies in Surface Science and Catalysis 101 (1996) 641-650, (D7)).

In the absence of NO$_x$, higher activity was found for Cu or Co-exchanged zeolites than for the corresponding Fe zeolites.

In the descriptions set out in the prior art (D6, D7) of N$_2$O decomposition in the presence of an Fe-ZSM-5-catalyst at 400° C., use is usually made of equimolar amounts of NO and N$_2$O. In D6 and D7, the effect of NOx and N$_2$O decomposition falls constantly as NO/N$_2$O ratio sinks, and therefore N$_2$O decomposition becomes unsatisfactory when the NO/N$_2$O ratio is below 0.5.

The best results are found when the molar ratio NO/N$_2$O is 1 or greater than 1.

According to the authors, when this catalyst is used for N$_2$O reduction in the waste gas from nitric acid production, the NO$_2$ formed could be returned to the process for obtaining HNO$_3$. Depending on the version of the process, the NOx concentration and N$_2$O concentration in the waste gas are about 1 000 ppm.

WO 99/34901 relates to iron-containing zeolites based on ferrierite for reducing N$_2$O-containing gases. The catalysts used here comprise from 80 to 90% of ferrierite, and also binders. The water content of the gases to be reduced is in the range from 0.5 to 5%. When various zeolite types are compared, the best results for decomposition of N$_2$O at temperatures of from 375 to 400° C. were obtained using zeolites of FER (ferrierite) type (97% N$_2$O decomposition at 375° C. and NO/N$_2$O=1). Substantially less decomposition was found when using zeolites of pentasil (MFI) type of mordenite (MOR) type. Indeed, the maximum N$_2$O decomposition achievable under the above conditions when iron-containing MFI zeolites were used was only 62%.

In the light of the known prior art, it is therefore an object to provide an economic process, in particular for $HNO_3$ production, which permits not only high levels of $NO_x$ decomposition but also satisfactory $N_2O$ decomposition.

In particular, good results for $N_2O$ decomposition are to be obtained even when the $NOx/N_2O$ ratio is substoichiometric, in particular at the ratios which result after NOx content reduction, i.e. at a ratio <0.5, preferably <0.1.

The present invention achieves this object and provides a process for reducing the $NO_x$ concentration and $N_2O$ concentration from the tail gas from nitric acid production, where the tail gas leaving the absorption column is passed, prior to entry into the tail gas turbine, through a combination of two stages, the first stage (DeNOx stage) reducing the NOx content and the second stage (DeN$_2$O stage) reducing the $N_2O$ content of the gas, and where the $NOx/N_2$) ratio prior to entry of the gas into the second stage [lacuna] in the range from 0.001 to 0.5, preferably in the range from 0.001 to 0.2, in particular in the range from 0.01 to 0.1, and in the second stage this gas is brought into contact with a catalyst which is substantially composed of one or more iron-loaded zeolites.

Catalysts used according to the invention are composed substantially of one or more iron-loaded zeolites, preferably >50% by weight, in particular >70% by weight. For example, alongside an Fe-ZSM-5 zeolite there may be another iron-containing zeolite present in the catalyst used according to the invention, e.g. an iron-containing zeolite of the MFI type or MOR type. The catalyst used according to the invention may moreover comprise other additives known to the skilled worker, e.g. binders.

The catalysts used for the DeN$_2$O stage are preferably based on zeolites into which iron has been introduced via solid-phase ion-exchange. The usual starting materials here are the commercially available ammonium zeolites (e.g. $NH_4$-ZSM-5) and the appropriate iron salts (e.g. $FeSO_4×7H_2O$), these being mixed intensively with one another by mechanical means in a bead mill at room temperature. (Turek et al.; Appl. Catal. 184, (1999) 249-256; EP-A-0 955 080). These citations are expressly incorporated herein by way of reference. The resultant catalyst powders are then calcined in a furnace in air at temperatures in the range from 400 to 600° C. After the calcinations process, the Fe zeolites are thoroughly washed in distilled water, and the zeolites are filtered off and dried. The resultant Fe zeolites are finally treated with the suitable binders and mixed, and extruded to give, for example, cylindrical catalysts bodies. Suitable binders are any of the binders usually used, the most commonly used here being aluminum silicates, e.g. kaolin.

According to the present invention, the zeolites which may be used are iron-loaded zeolites. The iron content here, based on the weight of zeolite, may be up to 25%, but preferably from 0.1 to 10%. Particularly suitable zeolites here are of the type MFI, BETA, FER, MOR, and/or MEL. Precise details concerning the build or structure of these zeolites are given in the Atlas of Zeolithe Structure Types, Elsevier, 4th revised Edition 1996, which is expressly incorporated herein by way of reference. According to the invention, preferred zeolites are of MFI (pentasil) type or MOR (mordenite) type. Zeolite Fe-ZSM-5 type are particularly preferred.

Figure 2:
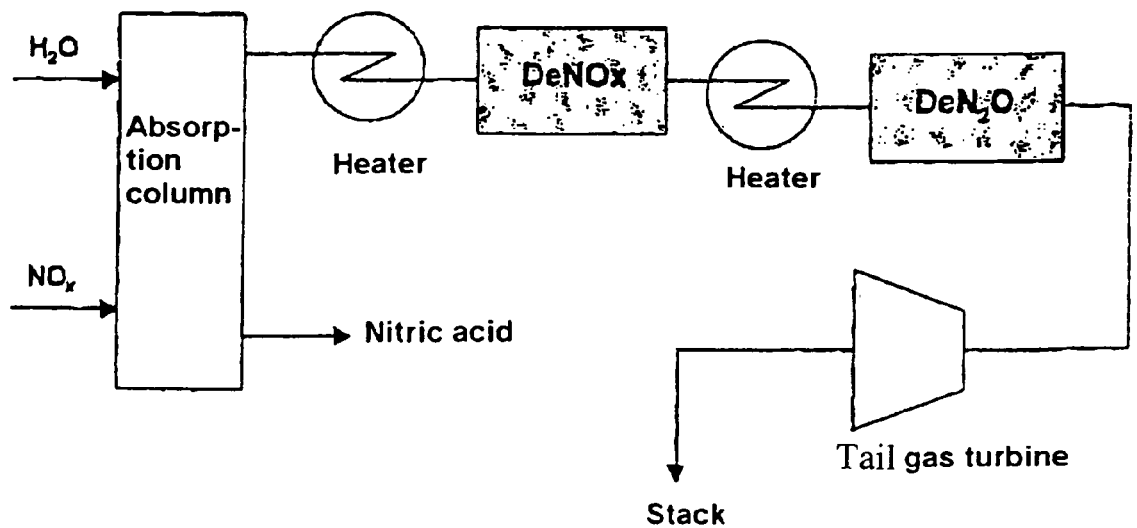

According to the present invention, DeN$_2$O catalysts are arranged in combination with an upstream DeNOx stage, between the absorption column and the tail gas turbine, in such a way that the tail gas leaving the absorption column is first passed at temperatures <400° C., in particular <350° C., into a reactor (first stage) in which the NOx content of the gas is reduced to <100 ppm (cf. FIG. 2). The operating pressure for this first stage is preferably from 1 to 15 bar, in particular from 4 to 12 bar.

The upstream DeNOx stage corresponds to a process usually used in nitric acid plants of the prior art for reducing the amount of NOx emissions. However, the remaining NOx content of the tail gas has to be sufficiently high to permit the cocatalytic effects of NO or $NO_2$ to be active in the downstream DeN$_2$O stage.

If the DeN$_2$O stage is operated without upstream DeNOx, i.e. if the entering stream has approximately equimolar amounts of NO and $N_2O$, return of the $NO_2$ formed by $NO+N_2O \rightarrow N_2+NO_2$ into the $HNO_3$ process is uneconomic, due to the relatively low $NO_2$ concentration, <2 000 ppm.

The $N_2O$ content of the gas remains substantially unaltered in the DeNOx stage. After leaving the first stage, therefore, the $NO_x$ content of the gas is usually from 1 to 200 ppm, preferably from 1 to 100 ppm, in particular from 1 to 50 ppm, and its $N_2O$ content is from 200 to 2 000 ppm, preferably from 500 to 1 500 ppm. The resultant $NOx/N_2O$ ratio after leaving the DeNOx stage is from 0.001 to 0.5, preferably from 0.001 to 0.2, in particular from 0.01 to 0.1. The water content of the gas, both after leaving the absorption column and, respectively, the DeNO$_x$ stage and after leaving the DeN$_2$O stage, is usually in the range from 0.05 to 1%, preferably in the range from 0.1 to 0.8%, in particular in the range from 0.1 to 0.5%.

The tail gas conditioned in this way is then passed into the downstream DeN$_2$O stage, where decomposition of the $N_2O$ into $N_2$ and $O_2$ is brought about by utilizing a cocatalytic effect of NOx in the presence of the appropriate zeolite catalyst.

Surprisingly, it was found that in the presence of the iron-containing zeolite catalysts used according to the invention $N_2O$ decomposition is drastically increased (cf. FIG. 1) even in the presence of small amounts of NOx, i.e. when the molar $NOx/N_2O$ ratio is <0.5. An effect which becomes markedly more pronounced as the temperature increases. According to the present invention, therefore, at 450° C., for example, a molar $NO_x/N_2O$ ratio of 0.01 is still sufficient to lower the $N_2O$ concentration from 72% to 33% in the presence of an Fe-ZSM-5 catalyst. This is all the more astounding since in the prior art the accelerated decomposition of $N_2O$ is attributed to the abovementioned stoichiometric reaction of $N_2O$ with NO. If the temperature is sufficient it appears that if the $NO_x/N_2O$ ratio is small $NO_x$ adopts the role of a homogeneous cocatalyst which accelerates $N_2O$ decomposition as in $N_2O \rightarrow N_2+\frac{1}{2}O_2$. If the $NO_x/N_2O$ ratio is within the abovementioned limits, maximum decomposition of $N_2O$ is possible in the downstream DeN$_2$O stage. As soon as the ratio falls away below 0.001, $N_2O$ decomposition also sinks to values which become unsatisfactory (cf Example 5). The content of $N_2O$ in the process of the invention after leaving the DeN$_2$O stage is in the range from 0 to 200 ppm, preferably in the range from 0 to 100 ppm, in particular in the range from 0 to 50 ppm.

The operating temperature for the DeN$_2$O stage here is in particular determined by the desired degree of decomposition of $N_2O$ and the amount of NOx present in the tail gas, but also, as is known to the skilled worker and like almost all catalytic waste gas purification processes, highly dependent on the catalyst loading, i.e. on the waste gas throughput based on the amount of catalyst. The operating temperature for the second stage is preferably in the range from 300 to 550° C., in particular the range from 350 to 500° C., the pressure being in the range from 1 to 15 bar, in particular from 4 to 12 bar. As pressure rises, the cocatalytic action of NOx on $N_2O$ decomposition becomes greater, and increase of pressure therefore permits a further drop in operating temperature.

In determining or setting the operating temperature, account also has to be taken of the content of oxygen and $H_2O$. This content can vary within certain limits, depending on the mode of operation and on the version of the process used for nitric acid production, and inhibits $N_2O$ conversion. The $O_2$ content is in the range from 1 to 5% by volume, in particular in the range from 1.5 to 4% by volume.

N2O decomposition of >90%, in particular >95%, can therefore be achieved at temperatures in the range from 300 to 550° C., preferably from 350 to 500° C., using the iron-containing zeolite catalysts used according to the invention. As temperature rises it is even possible to achieve satisfactory $N_2O$ decomposition when the $NO_x/N_2O$ ratio is 0.01.

By combining a DeNOx stage and a DeN$_2$O stage, the process of the invention permits the NOx content and $N_2O$ content of the tail gas to be reduced to minimal values during nitric acid production. The arrangement of the DeNox stage prior to the DeN$_2$O stage and between absorption column and tail gas turbine moreover makes the process of the invention very economic, due to the continuously rising temperature profile.

Furthermore, the arrangement of both stages prior to the decompression turbine makes the conduct of the process particularly advantageous, since both stages can be operated at superatmospheric pressure (between 4 and 11 bar, depending on the version of the $HNO_3$ process), resulting in a reduction of the volume of reactor and, respectively, catalyst effectively needed.

Furthermore, since the DeNOx stage operates even at relatively low temperatures, sufficient reduction of $NO_x$ content during plant start-up is also ensured when only little process heat is available.

Another advantage of arranging both stages between absorption column and tail gas turbine in a continuously rising temperature profile is that the tail gas leaving the inventive combination can be introduced, without prior cooling, and without any other measures for waste gas purification, directly to the tail gas turbine for ideal reclamation of compressive and thermal energy.

EXAMPLES

DeNOx Stage

The DeNOx catalyst used as described with $NH_3$ as reducing agent upstream of the DeN$_2$O catalyst was a conventional SCR catalyst based on $V_2O_5$-$WO_3$-/$TiO_2$ (cf., for example, G. Ertle, H. Knözinger J. Weitkamp: Handbook of Heterogeneous Catalysis, Volume 4, pages 1633-1668). This was operated at a temperature of 350° C. Depending on the amount of $NH_3$ introduced, various $NO_x$ contents and therefore $NO_x/N_2O$ ratios were set at the outlet from the DeNOx stage.

DeN$_2$O Stage

An iron-containing MFI catalyst was prepared by solid-phase ion exchange, starting from a commercially available ammonium-form zeolite (ALSI-PENTA, SM27). Detailed information concerning the preparation process may be obtained from: M. Rauscher, K. Kesore, R. Mönnig, W. Schwieger, A. Tiβler, T. Turek, Appl. Catal. 184 (1999) 249-256.

The catalyst powders were calcined in air for 6 h at 823 K, washed and dried overnight at 383 K. Extrusion to give cylindrical catalyst bodies (2×2 mm) followed after addition of appropriate binders.

The experiments were carried out in a flux apparatus operated at steady state with on-line analysis, the space velocity in each case being 10 000 $h^{-1}$.

The composition of the feed was
1 000 ppm $NO_x$,
1 000 ppm $N_2O$
0.5% vol $H_2O$
2.5% vol $O_2$
remainder $N_2$ The following residual concentrations of $NO_x$ and $N_2O$ were obtained by varying the amount of $NH_3$ added:

| Example | Amount of $NH_3$ added | Resultant $NO_x$ concentration (after DeNOx stage at 350° C.) | Resultant $NO_x/N_2O$ ratio (after DeNOx stage) | Resultant $N_2O$ concentration (after DeN$_2$O stage at 475° C.) |
|---|---|---|---|---|
| 1 | 500 ppm | 500 ppm | 0.5 | 40 ppm |
| 2 | 800 ppm | 200 ppm | 0.2 | 54 ppm |
| 3 | 950 ppm | 50 ppm | 0.05 | 81 ppm |
| 4 | 990 ppm | 10 ppm | 0.01 | 99 ppm |
| 5 | 1000 ppm | <1 ppm | <0.001 | 462 ppm |

As can be seen from the examples given, a high level of $N_2O$ decomposition is possible up to an $NO_x/N_2O$ ratio of 0.001, in particular 0.01. If the ratio sinks below this limit, the decomposition level becomes inadequate, since there is no longer sufficient cocatalytic function of $NO_x$.

What is claimed is:

1. A process for reducing the $NO_x$ concentration and $N_2O$ concentration from the tail gas from nitric acid production using an absorption column and a tail gas turbine, where the tail gas leaving the absorption column is passed, prior to entry into the tail gas turbine, through a combination of two stages, the first stage reducing the $NO_x$ content by catalytic reduction, and the second stage reducing the $N_2O$ content of the gas by decomposition into nitrogen and oxygen, and where the molar $NO_x/N_2O$ ratio prior to entry of the gas into the second stage is in the range from 0.01 to 0.5, and in the second stage this gas is brought into contact with a catalyst which comprises one or more iron-loaded zeolites, the operating pressure in the second stage being from 4 to 12 bar, with the proviso that said one or more iron-loaded zeolites does not comprise FER type iron-loaded zeolite.

2. The process as claimed in claim 1, characterized in that the iron-loaded zeolite(s) present in the catalyst are of MFI, BEA, MOR and/or MEL type.

3. The process as claimed in claim 2, characterized in that the iron-loaded zeolite (s) are of MFI type.

4. The process as claimed in claim 3, characterized in that the zeolite is an Fe-ZSM-5.

5. The process as claimed in claim 1, characterized in that the temperature of the first stage is <400° C.

6. The process as claimed in claim 1, characterized in that the temperature of the second stage is in the range of 300 to 550° C.

7. The process as claimed in claim 1, characterized in that both stages are operated at a pressure in the range of from 4 to 12 bar.

8. The process as claimed in claim 1, characterized in that the first stage is operated using the SCR process.

9. The process as claimed in claim 1, characterized in that, after leaving the absorption column and prior to entry into the first or second stage, use is made of the tail gas whose water content is in the range from 0.05 to 1% by volume.

10. The process as claimed in claim 1, characterized in that, prior to entry into the second stage, $NO_x$ content of the gas is in the range from 1 to 200 ppm and the $N_2O$ content of the gas is in the range from 200 to 2000 ppm.

11. The process as claimed in claim 5, characterized in that the temperature of the first stage is <350° C.

12. The process as claimed in claim 6, wherein the temperature of the second stage is in the range of 350 to 500° C.

13. The process as claimed in claim 9, wherein the water content of the tail gas is in the range from 0.1 to 0.8% by volume.

14. The process of claim 1, wherein the catalyst comprises greater than 50% by weight of said iron-loaded zeolites.

15. The process of claim 1, wherein the catalyst comprises greater than 70% by weight of said iron-loaded zeolites.

16. The process of claim 14, wherein the iron-loaded zeolite(s) are of the MFI type.

17. The process of claim 15, wherein the iron-loaded zeolite(s) are of the MFI type.

18. The process of claim 16, wherein the iron-loaded zeolite is an Fe-ZSM-5.

19. The process of claim 17, wherein the iron-loaded zeolite is an Fe-ZSM-5.

20. The process as claimed in claim 1, wherein the molar $NO_x/NO_2$ ratio is less than 0.1.

21. The process as claimed in claim 1, wherein the molar $NO_x/NO_2$ ratio is from 0.01 to 0.1.

22. The process as claimed in claim 1, wherein the first stage catalytic reduction reduces the NO content to less than 100 ppm.

* * * * *